United States Patent [19]

Hwang

[11] Patent Number: 5,216,407
[45] Date of Patent: Jun. 1, 1993

[54] PREALARM SYSTEM FOR AN ANTI-THEFT ALARM

[76] Inventor: Shih-Ming Hwang, No. 11, Alley 12, Lane 7, Ching Tyan Street, Taipei, Taiwan

[21] Appl. No.: 848,199

[22] Filed: Mar. 10, 1992

[51] Int. Cl.$^5$ .............................................. B60R 25/10
[52] U.S. Cl. ..................................... 340/426; 340/429
[58] Field of Search ................................ 340/426, 429

[56] References Cited

U.S. PATENT DOCUMENTS 4,987,402  1/1991  Nykerk ................................ 340/426
5,049,867  9/1991  Stouffer ............................... 340/426

*Primary Examiner*—Glen R. Swann, III
*Attorney, Agent, or Firm*—Morton J. Rosenberg; David I. Klein

[57] ABSTRACT

A prealarm system is provided for an anti-theft alarm where a signal from a displacement/vibration detector is picked up by a one-shot timer circuit. If no other activation signal is picked up after the first signal is received a main control alarm circuit is activated for (1) driving a siren circuit to generate a short chirp sound as an audible warning, and (2) a flashing circuit to flash a light for a preset period of time as a visible warning. If the number of activation signals received subsequent to the first are greater than a predetermined threshold number, or the activation signal continues for a predetermined period of time, the main control alarm circuit is activated for driving, (1) the siren circuit to give a normal audible signal alarm, and (2) both, the flashing circuit for flashing a light and the dome light control to provide visible signals.

2 Claims, 2 Drawing Sheets

PREALARM SYSTEM FOR AN ANTI-THEFT ALARM

BACKGROUND OF THE INVENTION

The present invention provides a prealarm system for an anti-theft alarm to provide a pre-alerting signal by detection of a moving object or vibration.

Generally each anti-theft device includes one or more detectors of the same or different types, and the sensitivity of such detectors can be adjusted to provide the best anti-theft effect. However, if the sensitivity is too low, the detector can't detect invasion. If the sensitivity is too high, a slight and unintentional shock can enable the alarm and thereby bring the inconvenience of a false alarm.

The instant invention provides a prealarm system for an anti-theft alarm which has the following features:

(1) Sensitivity of the burglar-proof alarm can be adjusted without generation of the normal siren alarm during assembly, to avoid unnecessary noise;

(2) Upon an attempt to break into the protected area, the system can generate a prealarm at the very beginning of the attempt, to stop any further invasion;

(3) It can warn others not to attempt to invade cars or buildings having the instant system installed; and, (4) Its owner can check for sensibility of the alarm by using the prealarm system.

SUMMARY OF THE INVENTION

The main object of the present invention is to provide a prealarm system for an anti-theft alarm in which a signal from a displacement/vibration detector is picked up by a one-shot timer circuit. If no other activation signal is picked up after the first signal, a main control alarm circuit activates a siren circuit to give a short chirp sound, as an audible warning, and a flashing circuit to flash a light for a preset period of time, as a visible warning. Additionally, another output is provided to drive another warning signal, such as paging system to call the owner's pager or portable phone. If, on the other hand, a number of activation signals, greater than a preset number, are picked up after the first activation signal, or the activation signal continues for a predetermined period of time, the main control alarm circuit activates the siren circuit to give a normal audible alarm signal and the flashing circuit to flash the cab light to give a visible signal.

DETAILED DESCRIPTION OF THE PREFERRED EMBODIMENT

Figure 1:
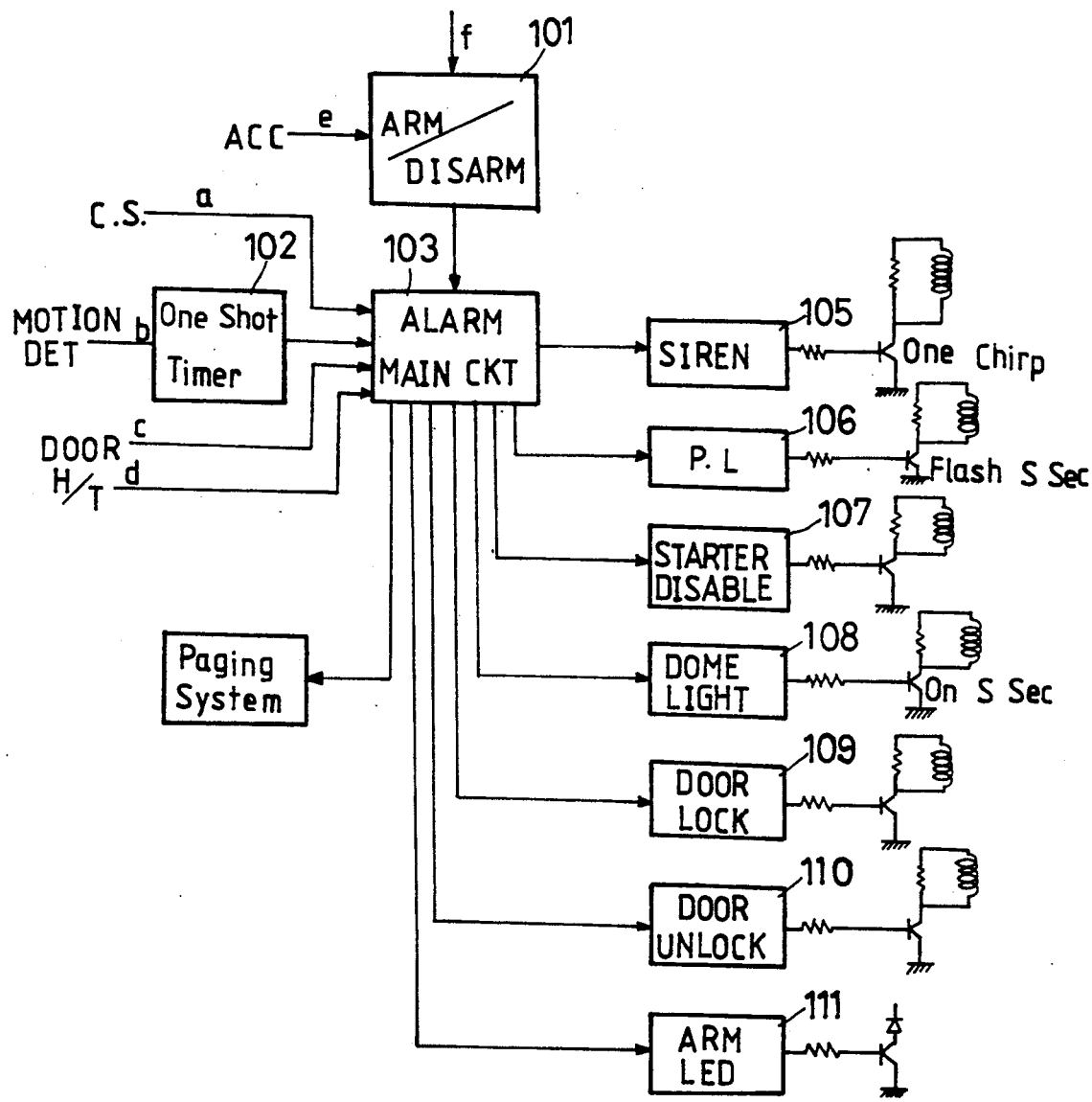
FIG. 1 is a block diagram of the prealarm system for an anti-theft alarm according to the present invention.

As shown in FIG. 1, point a is an input from a detector. If the circuit is activated, it gives the main control alarm circuit 103 a signal to cause a siren circuit 105 to give an audible alarm, and the flashing circuit 106 to flash lights. Point b is for input from a displacement/vibration detector and/or glass crashing detector. When the circuit is activated, the one-shot timer circuit 102 picks up the first activation signal, and if no further activation signals are received within a preset period of time, it sends the main control alarm circuit 103 a signal to cause the siren circuit 105 to give a short chirp sound, and the flashing circuit 106 to flash lights for a predetermined period of time, or to drive a sound synthesizer circuit to give an audible verbal signal. If a number of activation signals from the one-shot timer circuit are sent to the main control alarm circuit which are greater than a threshold number, during the present period of time, or the activation signals continue to occur repeatedly after the preset period of time, the main control alarm circuit 103 activates (1) the siren circuit 105 to give a normal audible alarm signal, (2) the flashing circuit 106 to flash lights, and (3) a dome light control circuit 108 to provide visible signals.

The present invention incorporates a one-shot timer circuit 102 which may activate a sound synthesizer circuit to give verbal alert, or cause bulb or LED to flash as a warning, and to work in combination with indoor or outdoor anti-theft alarm systems.

Point c is an input connecting to the vehicle doors. When the last door is closed, the point c provides the main control alarm circuit 103 with an activation signal to drive, (1) the siren circuit 105 to give a short "beep" signal, (2) the flashing circuit 106 and the cab light control circuit 108 to flash, (3) the door locking circuit 109 to lock all the doors automatically, (4) the starter disable circuit 107 to prevent operation of the starter, and (5) the alert indicator 111, its illumination indicating that the anti-theft alarm is operating normally and it is in alerting state. Point d is for input from trunk lid and engine hood. If the trunk lid or the engine hood is not closed properly, the activation signal from the point c input from the door, even if the doors have been properly closed, will not cause the main control alarm circuit 103 to enter the aforesaid alerting state. The failure to enter the alert state provides an indication that the trunk lid or engine hood are not properly closed. Point e provides an input from the ignition switch and point f is an input for a remote signal to enable and disable the alerting state of the system via arm/disarm circuit 101. The system further includes a paging system for providing an output to send a warning signal to car owner's pager or portable phone.

Figure 2:
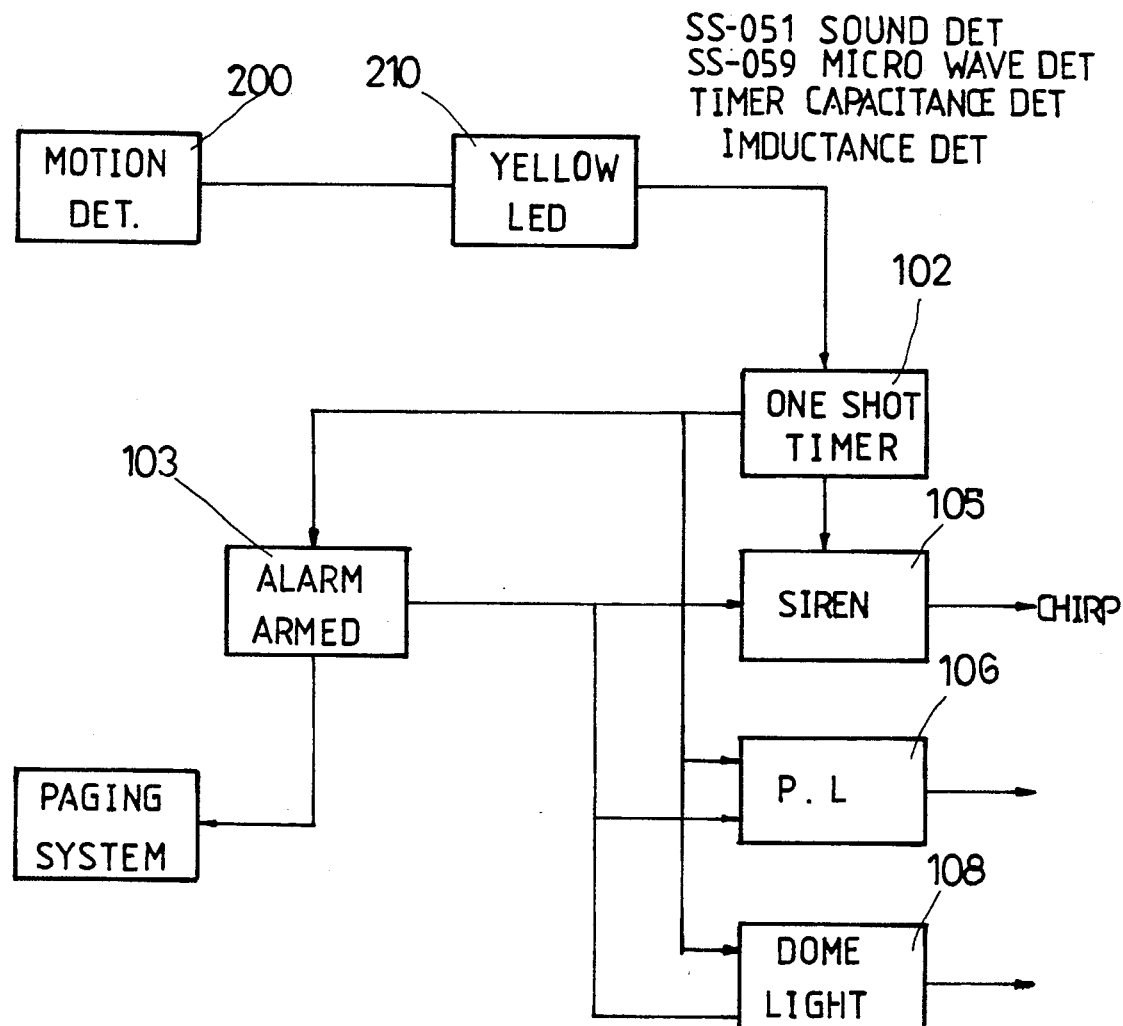
FIG. 2 is a block diagram of a local control circuit according to the present invention; and, FIG. 3 is a circuit diagram of a one-shot timer circuit according to the present invention.

FIG. 2 is a block diagram of a local control circuit according to the present invention. There is a displacement/vibration detector 200, which can be a sound wave detector, microwave detector, capacitor, glass crashing detector, or infrared detector. A yellow LED 210 is provided as indicator for sensitivity adjustment of the detector, so that the sensitivity of the detector can be adjusted by observing the turning on and off of the yellow LED 210. The yellow LED 210 provides the one-shot timer circuit 102 with an input, from which then a signal is output to the main control alarm circuit 103, the siren circuit 105, the flashing circuit 106, or dome light control circuit 108.

Figure 3:
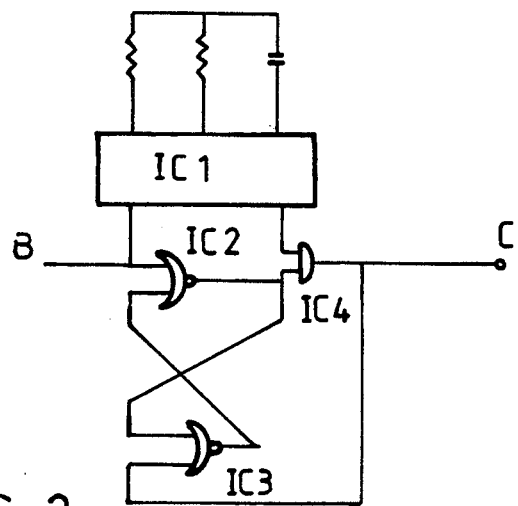

FIG. 3 is an embodiment of the one-shot timer circuit according to the present invention. With a timer circuit $IC_1$, a NOR gate $IC_2$, a NOR gate $IC_3$, and an AND gate $IC_4$ connected as shown, a "Hi" level signal is output at point C upon receipt of the first signal input to point B within a preset period of time. Together with the circuit shown in FIG. 1, when there is a plurality of such outputs from the one-shot timer circuit, the main control alarm circuit 103 is activated to generate an alarm.

What is claimed is:

1. A prealarm system for coupling to an anti-theft alarm system, comprising:
    sensor means for generating at least one activation signal responsive to detection of an attempted entry into a vehicle;
    one-shot timer means coupled to said sensor means for generating a first control signal responsive to said activation signal;
    alarm control means coupled to said one-shot timer means for (1) generating a second control signal responsive to fewer than a predetermined number of occurrences of said first control signal in a selected time, or (2) generating a third control signal responsive to a predetermined number of occurrences of said first control signal in said selected time;
    alarm means coupled to said alarm control means for generating an audible warning tone signal responsive to said second control signal and an audible alarm signal responsive to said third control signal;
    light flashing means coupled to said alarm control means for flashing a light for a predetermined time period responsive to said second control signal and substantially continuously flashing said light responsive to said third control signal;
    dome light control means coupled to said alarm control means for illuminating a vehicle dome light responsive to said third control signal; and,
    paging signal means coupled to said alarm control means for transmitting a warning signal to a remote communication system responsive to said third control signal.

2. A prealarm system for coupling to an anti-theft alarm system, comprising:
    sensor means for generating at least one activation signal responsive to detection of an attempted entry into a protected space;
    one-shot timer means coupled to said sensor means for generating a first control signal responsive to said activation signal;
    alarm control means coupled to said one-shot timer means for generating a second control signal responsive to a predetermined number of occurrences of said first control signal in a selected time;
    alarm means coupled to said one shot timer means for generating an audible warning tone signal responsive to said first control signal, said alarm means being further coupled to said alarm control means for generating an audible alarm signal responsive to said second control signal;
    light flashing means coupled to said one-shot timer means for flashing a light for a predetermined time period responsive to said first control signal, said light flashing means being coupled to said alarm control means for substantially continuously flashing said light responsive to said second control signal; and
    a sensitivity indicator coupled intermediate said sensor means and said one-shot timer means for indicating the presence of said activation signal, whereby said sensitivity indicator facilitates sensitivity adjustment of said sensor means by providing a visual indication of an output from said sensor means.

* * * * *